(12) United States Patent
Saito et al.

(10) Patent No.: US 6,198,742 B1
(45) Date of Patent: Mar. 6, 2001

(54) ATM SWITCHING SYSTEM

(75) Inventors: Toshitada Saito, Kawasaki; Jun Hasegawa; Toshio Fujisawa, both of Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 08/972,064

(22) Filed: Nov. 17, 1997

(30) Foreign Application Priority Data

Nov. 18, 1996 (JP) .................................................. 8-306277

(51) Int. Cl.[7] .................................................. H04L 12/28
(52) U.S. Cl. .................................................. 370/395; 370/412
(58) Field of Search .................................................. 370/232, 235, 370/236, 359, 394, 395, 468, 469, 463, 412

(56) References Cited

U.S. PATENT DOCUMENTS

| | | | |
|---|---|---|---|
| 5,402,416 | * | 3/1995 | Cieslak et al. .................. 370/236 |
| 5,724,354 | * | 3/1998 | Tremel et al. ................... 370/395 |
| 5,920,558 | * | 7/1999 | Saito et al. ...................... 370/359 |

\* cited by examiner

*Primary Examiner*—Melvin Marcelo
*Assistant Examiner*—Phuongchau Ba Nguyen
(74) *Attorney, Agent, or Firm*—Hogan & Hartson, LLP.

(57) ABSTRACT

An input cell processing portion 11 and an output cell processing portion 12 in a line interface 10 execute a normal ATM process and an insertion/divergence process etc with respect to an input cell flow and an output cell flow. A cell buffer 40 is constructed on an external memory device to accumulate a template (format) of ATM cells to be processed. The input cell processing portion 11 or the output cell processing unit 12 in the line interface 10 judges whether a necessity for inserting the network management cell might arise or not when processing the input cell flow. Upon detecting herein that the insertion necessity arises, the management cell template previously held on the cell buffer 40 is read, and, after a necessary data replacing process has been executed thereon, the management cell is inserted into the input cell flow or the output cell flow.

19 Claims, 6 Drawing Sheets

ATM SWITCHING SYSTEM

BACKGROUND OF THE INVENTION

The present invention relates generally to an ATM (Asynchronous Transfer Mode) switching system and, more particularly, to an LSI-based line interface of an ATM switch, for inserting a management cell.

FIG. 6 is a diagram illustrating a construction of a line interface of a prior art ATM switch.

As shown in FIG. 6, a line interface 110 constructed of one LSI and provided between a physical layer 120 and an ATM cell switch 130. The line interface 110 includes an input cell processing portion 111, a first template 113, an output cell processing portion 112 and a second template 114. Herein, a cell flow from the physical layer 120 toward the ATM switch 130 is called a "input cell flow". A cell flow from the ATM switch 130 toward the physical layer 120 is termed an "output cell flow". The input cell processing portion 111 and the output cell processing portion 112 individually execute a normal ATM process and an insertion/divergence process etc with respect to the input cell flow and the output cell flow as well.

Generally, the ATM switching system requires such a function that network management cells such as an OAM (Operation And Maintenance) cell and an RM (Resource Management) cell etc are generated by a switch node and inserted into the cell flow. These inserted cells have a predetermined format and are therefore easy to generated on condition that they hold a cell data template.

The line interface 110 constituting the conventional ATM switch holds the cell template (format) through a RAM or a ROM within the LSI in order to correspond to the insertion of the cells such as the OAM cells and the RM cells having the fixed format. These are the first template 113 and the second template 114. Then, the input cell processing portion 111 and the output cell processing portion 112 execute the process of inserting the management cells into the input cell flow or the output cell flow on the basis of the first template 113 or the second template 114 as the necessity arises.

The line interface LSI constituting the prior art ATM switch, however, holds those templates through the RAM or the ROM within the LSI in order to correspond to the insertion of the cells such as the OAM cells and the RAM cells having the fixed format, which leads to an increase in size of the line interface LSI. Further, when using the ROM, the fixed format of the template is made unchangeable enough to produce such a possibility that the format might lose a degree of freedom to change corresponding to the system.

Moreover, when inserting the network management cells such as the OAM cells and the RM cells, in the conventional ATM switch, a fixed type sequencer executes a series of processes ranging from a judgement of a necessity for inserting the management cells, a generation of the management cells to the insertions into the input/output cell flows, and it was therefore impossible to flexibly deal with alterations in processing contents that correspond to the systems and alterations due to changes in specifications of communications protocol.

Further, a system for incorporating a microcode sequencer into the line interface LSI in the line interface module has been proposed as a system for coping with the problem concerning the flexibility described above. This system is, however, based on the premise that the series of processes ranging from the judgement of the necessity for inserting the management cells to the insertion into the cell flow are to be executed within a 1-cell processing time by two microcode sequencers for respectively managing the I/O cell flows. Therefore, an excessive performance has been demanded of a processing throughput of the sequencer.

SUMMARY OF THE INVENTION

It is a first object of the present invention to downsize a line interface device by retaining a data template in a fixed format of a network management cell on a cell buffer, and simultaneously easily change a specified value of the template.

It is a second object of the present invention to provide a contrivance capable of flexibly dealing with a change in a processing content itself, in which each of processing devices for processing input/output cell flows is constructed of a microcode sequencer, and processes relative to generation and insertion of the management cells are thereby controlled based on firmware.

It is a third object of the present invention to reduce burdens upon input/output cell processing devices by providing an independent processing device for executing a process of inserting the management cell in addition to the input/output cell processing devices, and to converge the processes relative to the template of the management cell at one place.

It is a fourth object of the present invention to provide a contrivance capable of flexibly dealing with a change in processing content itself, in which each of an input cell processing portion, an output cell processing portion and a management cell generation/insertion processing portion is constructed of a microcode sequencer, and respective processes are thereby controlled based on firmware.

It is a fifth object of the present invention to enable a management cell generation/insertion processing portion to operate without depending on timing at which process requests are issued from an input cell processing portion and an output cell processing portion by transmitting the process request issued between the input and output cell processing portions and the management cell generation/insertion processing portion via a FIFO portion, and to reduce a throughput of the management cell generation/insertion processing portion down to substantially an average throughput of a request issuance.

It is a sixth object of the present invention to downsize a line interface LSI by use of a buffer memory classified as an existing memory, and decrease costs on the side of users.

The present invention is characterized such that a cell inserting process is executed by an LSI constituting the line interface of an ATM switch, and, on the other hand, a template of cell data subjected to a cell inserting process is held within an external memory (cell buffer) managed by the line interface LSI in order to accumulate input/output cell flows.

Further, two internal processors for managing the input/output cell flows detect a necessity for inserting the cells in order to implement the cell insertion. A third internal processor, which executes a communications protocol process relative to an OAM cell and an RM cell, generates the insertion cells. On this occasion, what is characterized is an efficient preparation for the insertion cells with reference to the cell data template.

Moreover, a system for transmitting an indication of the cell insertion to the third processor from the two internal processors for managing the input/output cell flows, is characterized by directly transmitting a process request from the two processors to a process request FIFO portion for managing a processing content of the third processor.

DETAILED DESCRIPTION OF THE PREFERRED EMBODIMENTS

Embodiments of the present invention will hereinafter be respectively described.

(1) First Embodiment

Figure 1:
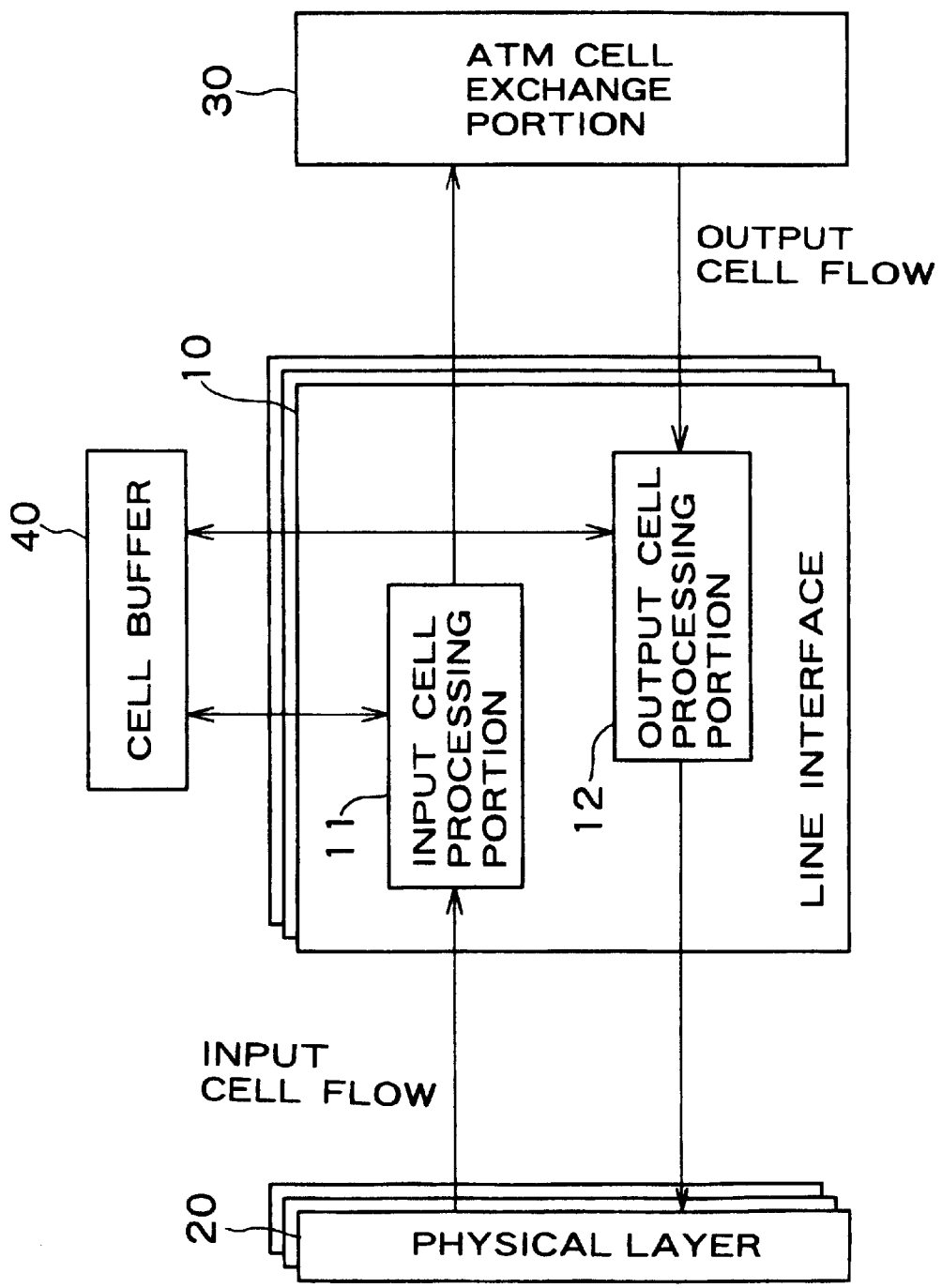
FIG. 1 is a diagram showing a construction of an ATM switching system in a first embodiment of the present invention.

FIG. 1 is a diagram showing a construction of an ATM switching system in a first embodiment of the present invention.

As illustrated in FIG. 1, a plurality of LSI-based line interfaces 10 are provided between physical layers 20 and an ATM cell switching portion 30. Herein, a cell flow from the physical layer 20 toward the ATM cell switching portion 30 is referred to as an "input cell flow". A cell flow from the ATM cell switching portion 30 toward the physical layer 20 is termed an "output cell flow".

In the ATM switching system to which a plurality of physical lines are connected, and each line connected to the physical layer 20. Each of these physical layers 20 is connected to the line interface 10. Further, these line interfaces 10 are connected to the ATM cell switching portion 30, wherein a cell switching process is executed.

The line interface 10 includes an input cell processing portion 11 and an output cell processing portion 12 that correspond respectively to the input and output cell flows. The input cell processing portion 11 and the output cell processing portion 12 execute a normal ATM process and an insertion divergence process etc with respect to the input cell flow and the output cell flow, respectively.

Moreover, a cell buffer 40 is constructed as an external memory unit in order to accumulate templates (formats) of the ATM cells to be processed. The input cell processing portion 11 and the output cell processing portion 13 in the line interface 10 are connected to the cell buffer 40 and are directly accessible thereto.

According to the present invention, there are assumed cases of inserting a loop back RDI (Remote Defect Indication) when receiving, e.g., an AIS (Alarm Indication signal) defined as one of OAM cells, inserting a loop back cell when receiving the loop back cell defined as one of the OAM cells, and inserting a backward RM cell by way of a BECN (Backward Explicit Congestion Notification) when receiving forwarding of the RM cell, as management cells for a network management which are to be inserted into the I/O cell flows.

Those network management cells have respective fixed formats, and, when inserting a cell, the cell that should be inserted can be generated simply by changing a par thereof. According to the present invention, the template (format) of the cell data that corresponds to the fixed format corresponding to each cell type, is previously held on the cell buffer 40. Then, when generating the cell, the corresponding template is read and processed, and the cell thereof is inserted into the I/O cell flows.

Figure 2:
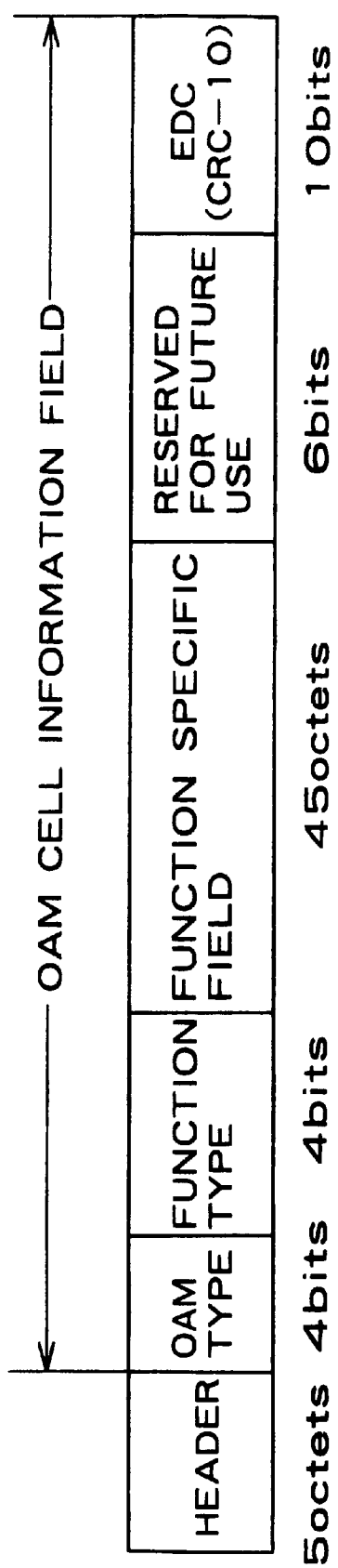
FIG. 2 is a diagram showing a specific example of a template stored in a cell buffer.

FIG. 2 shows a specific example of the template stored in the cell buffer.

FIG. 2 shows an OAM cell template (format) by way of one example of the template, wherein there are provided plural types of formats such as an "OAM type", a "function type" and a "function specific field" etc. Further, for example, one or some more types of templates are provided as RM cell templates (formats). One template has, e.g., 64 bytes, while the cell buffer 40 has, e.g., 64k cells (1 cell=64 bytes). Hence, the template for the management cell can be constructed by use of a very small storage area of the cell buffer 40. Moreover, when the normal user cell is transmitted, those templates are not used.

The operation will be explained referring back to FIG. 1. The input cell processing portion 11 of the line interface 10 judges whether or not a necessity for inserting the network management cell may arise when processing the input cell flow. Herein, when detecting that the necessity for the insertion arises, the management cell template previously held on the cell buffer 40 is read, and a necessary data replacing process is executed thereon. Thereafter, this management cell is inserted into the input cell flow or the output cell flow.

Further, the output cell processing portion 12 also similarly executes the process for the output cell flow.

The template for the data of the cells having the fixed format for the network management for the cell insertion, is held on the cell buffer 40, thereby eliminating the necessity for packaging a template holding portion in the line interface 10. This makes it feasible to downsize the line interface 10. Further, the template is actualized on an external memory constituting the cell buffer 40, and therefore it is easy to change the setting thereof as well as being easy to make a flexible correspondence to the alterations corresponding to the systems and to the changes in terms of the specifications of the communications protocol.

(2) Second Embodiment

Figure 3:
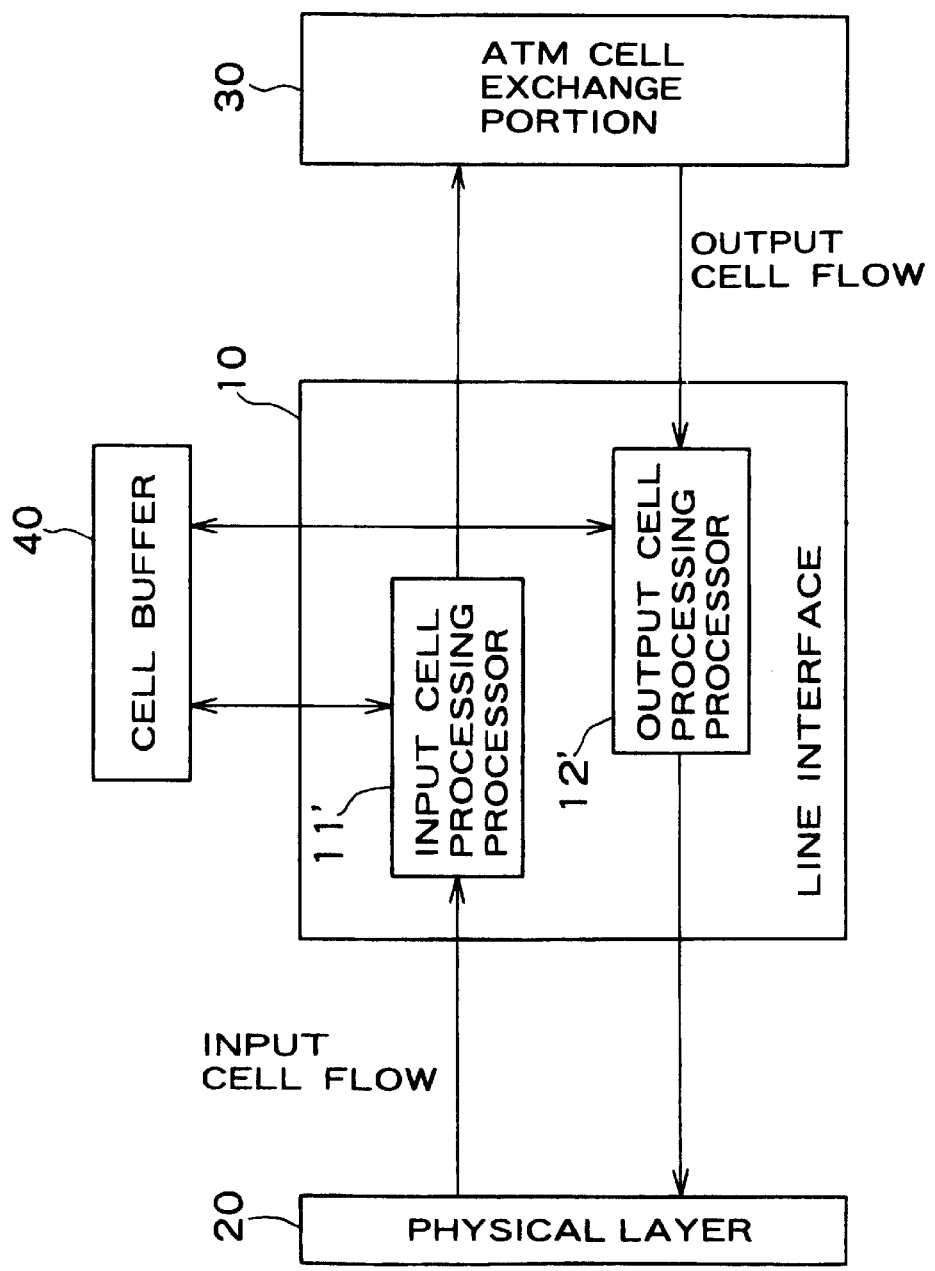
FIG. 3 is a diagram illustrating a construction of the ATM switching system in a second embodiment of the present invention.

FIG. 3 is a diagram showing a construction of the ATM switching system in a second embodiment of the present invention.

In accordance with the second embodiment, the input cell processing portion 11 and the output cell processing portion 12 of the line interface 10 in the first embodiment, are respectively replaced with an input cell processor 11' and an output cell processor 12', which are constructed of microcode sequencers or a combination with a fixed sequencer and the microcode sequencer.

Then, the process equal to the operation shown in the first embodiment is actualized through the processing by the microcode sequencer described above.

The effects shown in the first embodiment are exhibited, and simultaneously the process by the microcode sequencer is controlled by firmware, whereby a flexible change can be easily made with respect to the data rewriting process effected for the template.

(3) Third Embodiment

Figure 4:
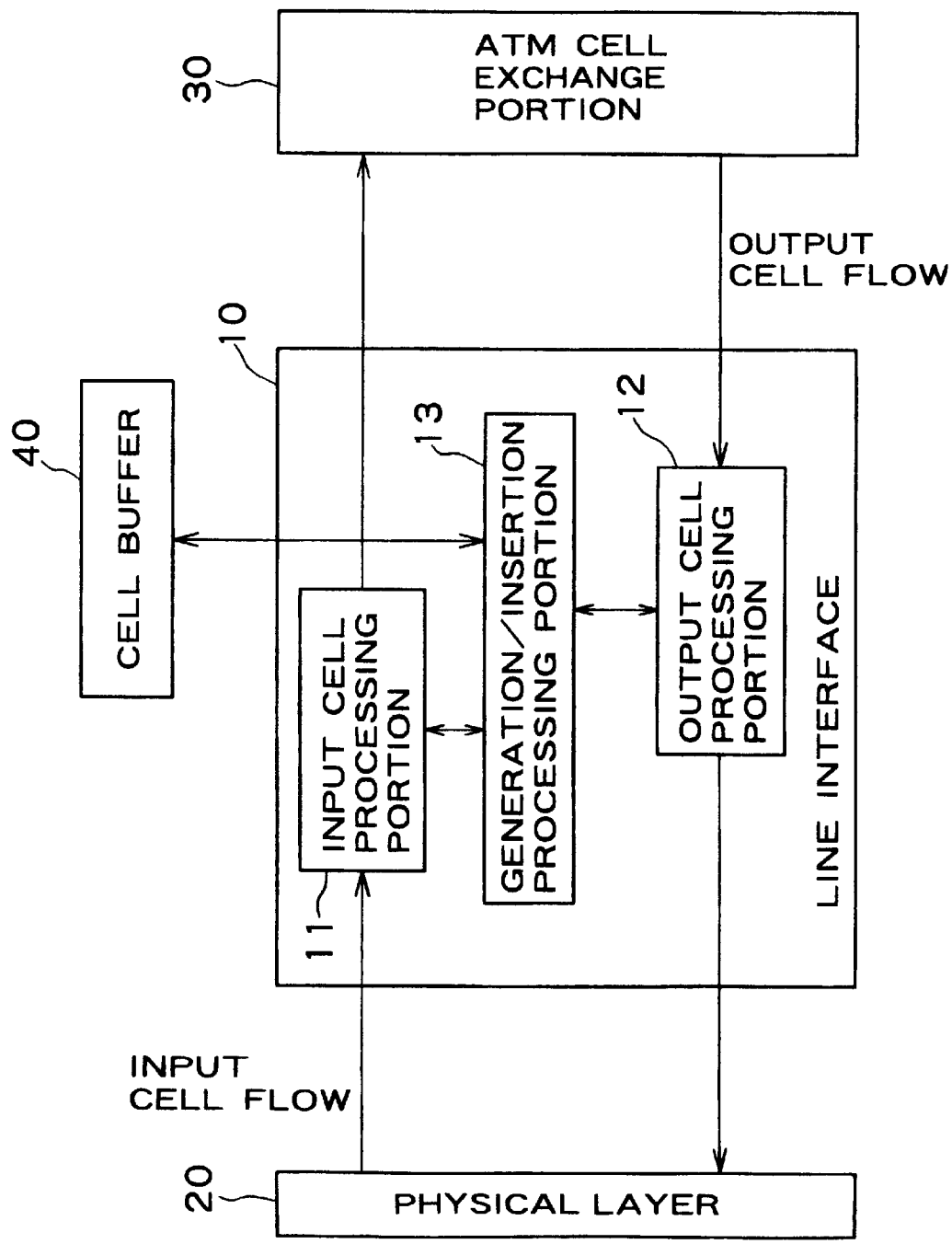
FIG. 4 is a diagram illustrating a construction of the ATM switching system in a third embodiment of the present invention.

FIG. 4 is a diagram illustrating a construction of the ATM switching system in a third embodiment of the present invention.

In accordance with the third embodiment, a generation/insertion processing portion 13 is provided in the line interface 10 in addition to the input cell processing portion 11 and the output cell processing portion 12. In the first embodiment, each of the input cell processing portions 11 or the output cell processing portions 12 executes a template operation for the management cells on the cell buffer. While in the third embodiment, this generation/insertion processing portion 13 executes the template operation of the management cells on the cell buffer.

Further, the input cell processing portion 11, the output cell processing portion 12 and the generation/insertion processing portion 13 can be each constructed of the fixed sequencer, the microcode sequencer or a combination of these sequencers.

The input cell processing portion 11 and the output cell processing portion 12 execute the processes with respect to the input cell flow and the output cell flow, judge whether or not there is a necessity for inserting the management cell, and, based on a result of this judgement, indicates the generation/insertion processing portion 13 to generate the management cell and to execute the process of inserting the cell. When indicated to execute the insertion process, the generation/insertion processing portion 13 reads the template on the cell buffer, rewrites the required data, and insert the cell into any one of the I/O cell flows.

In accordance with the third embodiment, the processes executed by the input cell processing portion 11 and the output cell processing portion 12 are limited to the management cell insertion necessity judging process, which makes it feasible to reduce a throughput by those two processing portions, downsize the processing portions, and converge the processes dealing with the templates on the generation/insertion processing portion 13. Further, the input cell processing portion 11, the output cell processing portion 12, the generation/insertion processing portion 13 are each constructed of the microcode sequencer, whereby the processes in the respective portions can be controlled by the firmware and the processing content itself can be easily changed.

(4) Fourth Embodiment

Figure 5:
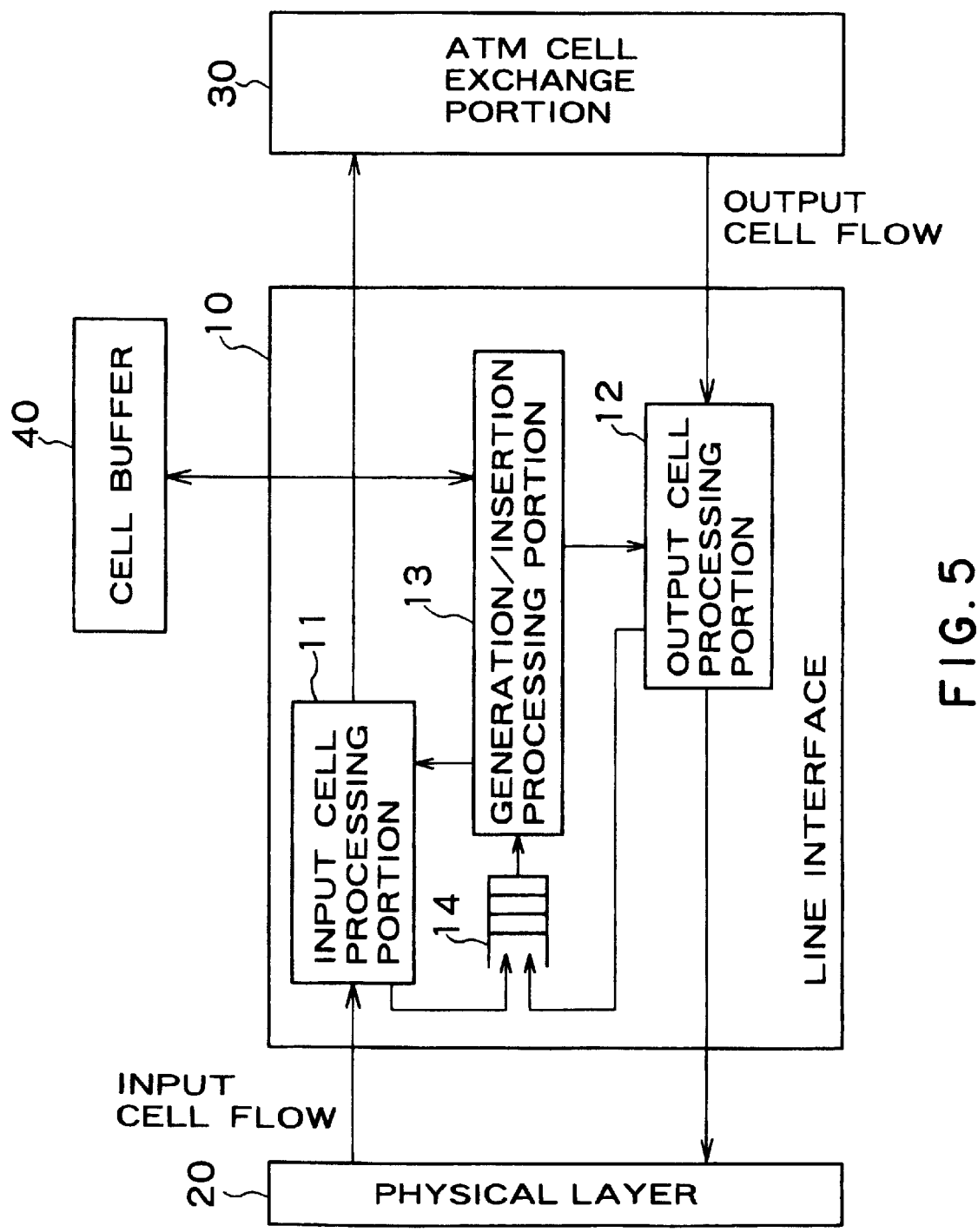
FIG. 5 is a diagram showing a construction of the ATM switching system in a fourth embodiment of the present invention.
Figure 6:
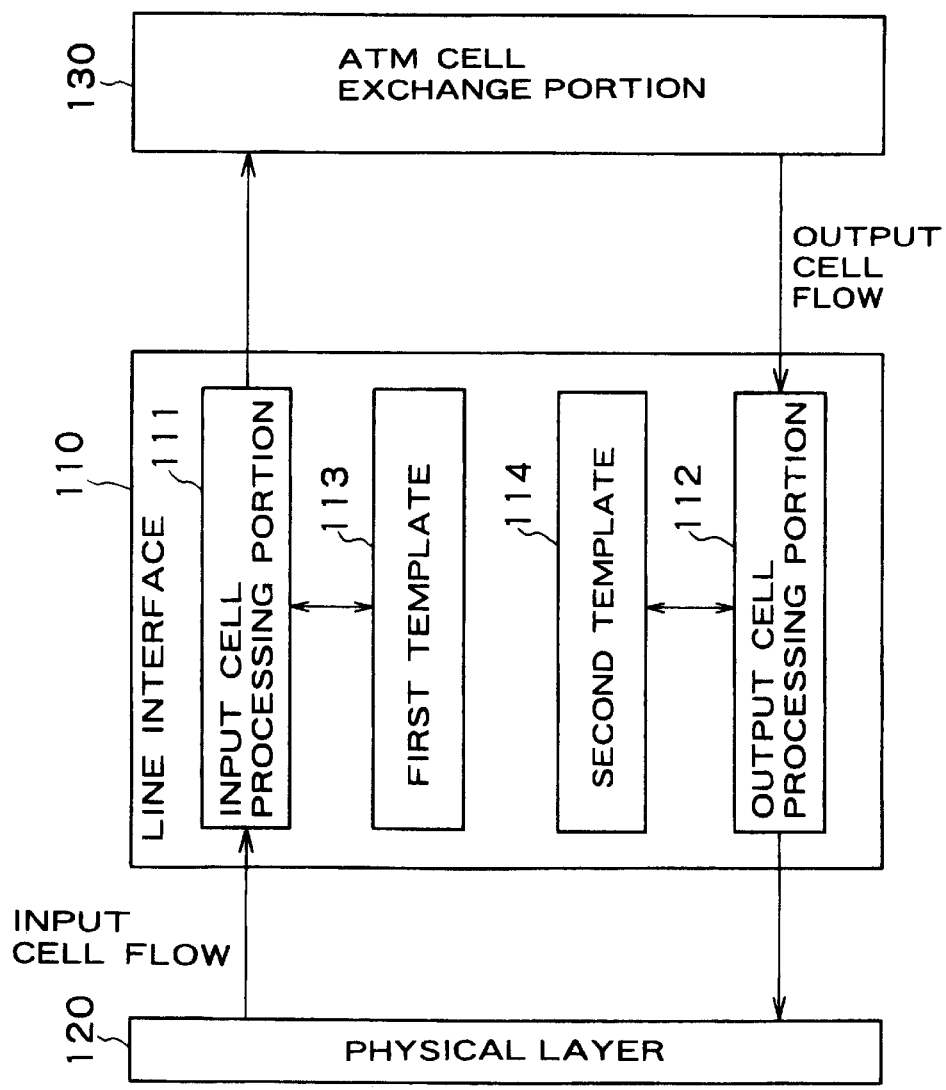
FIG. 6 is a diagram showing a construction of a line interface of a conventional ATM switch.

FIG. 5 is diagram showing a construction of the ATM switching system in a fourth embodiment of the present invention.

According to the fourth embodiment, when processing indications are given to the generation/insertion processing portion 13 from the input cell processing portion 11 and the output cell processing portion 12 in the third embodiment, the line interface 10 is provided with a process request FIFO unit 14 for temporarily accumulating a process request.

The input cell processing portion 11 and the output cell processing portion 12, which judged the necessity for inserting the management cell, indicate the generation/insertion processing portion 13 to generate the management cell and to insert the cell. The generation/insertion processing portion 13 is informed of a content of request for the insertion process via the process request FIFO unit 14. More specifically, each of the input cell processing portion 11 and the output cell processing portion 12 inputs a content of the requested process to the process request FIFO unit 14, and the generation/insertion processing portion 13 receives the process request together with its content from the process request FIFO unit 14, and executes the process indicated.

The input cell processing portion 11 and the output cell processing portion 12 implement the processes corresponding to arrivals of the I/O cell flows, and it is not self-evident when the process request should be issued to the generation/insertion processing portion 13. Therefore, the process request FIFO unit 14 is used for controlling processing timings of the input cell processing portion 11, the output cell processing portion 12 and the generation/insertion processing portion 13. Hence, a throughput of the generation/insertion processing portion 13 may be set so that the processing is completed within an average interval time of the management cell insertion made by the input cell processing portion and the output cell processing portion 12. This exhibits an effect of downsizing the generation/insertion processing portion 13.

Note that the management cell has been the very object discussed in the respective embodiments described above, however other than the management cell, the cell buffer 40 may be provided with templates for specific cells frequently treated and having a plurality of variations, and the present invention is applicable to such specific cells.

According to the present invention, as discussed above, the data template in the fixed format of the network management cell is retained on the cell buffer, thereby making it possible to downsize the line interface device and, at the same time, to easily change the specified value of the template.

Further, the processing devices for processing the I/O cell flows are each constructed of the microcode sequencer. Consequently, it is feasible to control the processes relative to the generation and the insertion of the management cell by use of the firmware and to flexibly correspond to the change in the processing content itself.

Moreover, burdens upon the I/O cell processing devices are reduced by providing the independent processing device for executing the process of inserting the management cell in addition to the I/O cell processing devices, and the processes pertaining to the templates of the management cells can be thereby converged at one place.

Furthermore, the input cell processing portion, the output cell processing portion and the management cell generation/insertion processing portion are each constructed of the microcode sequencer, which makes it feasible to control the respective processes by the firmware and to flexibly correspond to the change in the processing content itself.

Additionally, according to the present invention, the process request issued between the I/O cell processing portions and the management cell generation/insertion processing portion is transmitted via the FIFO unit. The management cell generation/insertion processing portion is thereby capable of operating without depending on the timings at which the process requests are issued from the input cell processing portion and the output cell processing portion. Then, the throughput of the management cell generation/insertion processing portion can be reduced down to substantially an average throughput of the request issuance.

Moreover, the line interface LSI can be downsized by use of the buffer memory which may be classified as an existing memory, and the costs on the side of the users can be decreased.

What is claimed is:

1. An ATM switching system comprising:

cell buffer means for retaining a template with respect to a management cell, said cell buffer means being constructed as an external memory; and line interface means comprising input cell processing means for receiving an input cell flow transmitted from a physical layer and transmitting the input cell flow to an ATM switch, and output cell processing means for receiving an output cell flow transmitted from said ATM switch and transmitting the output cell flow to said physical layer, said line interface means being constructed as an LSI-based line interface, wherein said input cell processing means and/or said output cell processing means accumulates the received input cell flow and/or the output cell flow, generates the management cell with reference to the template stored in said cell buffer means, and inserts the management cell into the input cell flow and/or the output cell flow, wherein the management cells are plural types of OAM cells and RM cells.

2. An ATM switching system comprising:

cell buffer means for retaining a template with respect to a management cell, said cell buffer means being constructed as an external memory;

line interface means comprising input cell processing means for receiving an input cell flow transmitted from a physical layer and transmitting the input cell flow to an ATM switch, and output cell processing means for receiving an output cell flow transmitted from said ATM switch and transmitting the output cell flow to said physical layer, said line interface means being constructed as an LSI-based line interface; and generation/insertion processing means, connected to said input cell processing means, said output cell processing means and said cell buffer means, for accumulating the input cell flow and/or the output cell flow received by said input cell processing means and/or said output cell processing means, generating the management cell with reference to the template stored in said cell buffer means, and inserting the management cell into the input cell flow and/or the output cell flow.

3. The ATM switching system according to claim 2, wherein said line interface means further comprises FIFO means, connected between said input and output cell processing means and said generation/insertion processing means, for controlling first-in first-out with respect to process requests given from said input cell processing means and aid output cell processing means.

4. An ATM switching system comprising:

cell buffer means for retaining a template with respect to a management cell, said cell buffer means being constructed as an external memory; and line interface means comprising input cell processing means for receiving an input cell flow transmitted from a physical layer and transmitting the input cell flow to an ATM switch, and output cell processing means for receiving an output cell flow transmitted from said ATM switch and transmitting the output cell flow to said physical layer, said line interface means being constructed as an LSI-based line interface, wherein said input cell processing means and/or said output cell processing means accumulates the received input cell flow and/or the output cell flow, generates the management cell with reference to the template stored in said cell buffer means, and inserts the management cell into the input cell flow and/or the output cell flow, wherein said input cell processing means and/or said output cell processing means is constructed of a microcode sequencer or a combination of said microcode sequencer and a fixed sequencer.

5. The ATM switching system according to claim 2, wherein said input cell processing means and/or said output cell processing means is constructed of a microcode sequencer or a combination of said microcode sequencer and a fixed sequencer.

6. The ATM switching system according to claim 3, wherein said input cell processing means and/or said output cell processing means is constructed of a microcode sequencer or a combination of said microcode sequencer and a fixed sequencer.

7. The ATM switching system according to claim 2, wherein said generation/insertion processing means is constructed of said microcode sequencer or said fixed sequencer or the combination of said sequencers.

8. The ATM switching system according to claim 3, wherein said generation/insertion processing means is constructed of said microcode sequencer or said fixed sequencer or the combination of said sequencers.

9. The ATM switching system according to claim 5, wherein said generation/insertion processing means is constructed of said microcode sequencer or said fixed sequencer or the combination of said sequencers.

10. The ATM switching system according to claim 6, wherein said generation/insertion processing means is constructed of said microcode sequencer or said fixed sequencer or the combination of said sequencers.

11. The ATM switching system according to claim 10, wherein the management cells are plural types of OAM cells and RM cells.

12. The ATM switching system according to claim 2, wherein the management cells are plural types of OAM cells and RM cells.

13. The ATM switching system according to claim 3, wherein the management cells are plural types of OAM cells and RM cells.

14. The ATM switching system according to claim 4, wherein the management cells are plural types of OAM cells and RM cells.

15. The ATM switching system according to claim 5, wherein the management cells are plural types of OAM cells and RM cells.

16. The ATM switching system according to claim 6, wherein the management cells are plural types of OAM cells and RM cells.

17. The ATM switching system according to claim 7, wherein the management cells are plural types of OAM cells and RM cells.

18. The ATM switching system according to claim 8, wherein the management cells are plural types of OAM cells and RM cells.

19. The ATM switching system according to claim 9, wherein the management cells are plural types of OAM cells and RM cells.

* * * * *